United States Patent [19]

Hartman, Jr.

[11] Patent Number: 5,224,166
[45] Date of Patent: Jun. 29, 1993

[54] SYSTEM FOR SEAMLESS PROCESSING OF ENCRYPTED AND NON-ENCRYPTED DATA AND INSTRUCTIONS

[75] Inventor: Robert C. Hartman, Jr., Woodside, Calif.

[73] Assignee: International Business Machines Corporation, Armonk, N.Y.

[21] Appl. No.: 928,850

[22] Filed: Aug. 11, 1992

[51] Int. Cl.$^5$ .......................... H04L 9/00; H04L 9/30
[52] U.S. Cl. .......................... 380/50; 380/4; 380/21; 380/23; 380/25; 380/30; 380/43; 380/49
[58] Field of Search .................. 380/4, 21, 23, 25, 30, 380/43, 49, 50, 52

[56] References Cited

U.S. PATENT DOCUMENTS

| | | | |
|---|---|---|---|
| 4,558,176 | 12/1985 | Arnold et al. | 380/4 |
| 4,634,807 | 1/1987 | Chorley et al. | 380/4 |
| 4,807,288 | 2/1989 | Ugon et al. | 380/30 |
| 4,847,902 | 7/1989 | Hampson | 380/4 |
| 4,850,017 | 7/1989 | Matyas, Jr. et al. | 380/21 |
| 4,888,798 | 12/1989 | Earnest | 380/4 |

Primary Examiner—Bernarr E. Gregory
Attorney, Agent, or Firm—Perman & Green

[57] ABSTRACT

A data processing system includes an internal cache memory in a secure physical region that is not accessible to a user of the system. An external memory is positioned outside of the secure physical region and stores encrypted and non-encrypted (i.e., plaintext) data and instructions. An instruction enables access of a private key contained within the secure physical region which is used to decrypt an encrypted master key that accompanies encrypted data and instructions. An interface circuit in the secure physical region decrypts each encrypted master key through the use of the private key and also decrypts encrypted data and instructions associated with each decrypted master key. A central processor accesses segments of both non-encrypted and encrypted data and instructions from the external memory and causes the interface circuit to employ a decrypted master key to decrypt data and instructions and to store the decrypted information in the internal memory cache. Non-encrypted data and instructions are directly stored in the internal memory cache.

15 Claims, 2 Drawing Sheets

SYSTEM FOR SEAMLESS PROCESSING OF ENCRYPTED AND NON-ENCRYPTED DATA AND INSTRUCTIONS

FIELD OF THE INVENTION

This invention relates to a system for seamlessly processing encrypted and non-encrypted data and instructions and, more particularly, to a data processing system that incorporates cryptographic architectural features that inhibit unauthorized usage of encrypted media.

BACKGROUND OF THE INVENTION

Substantial efforts have been devoted to the prevention of copying of proprietary software. Such efforts have generally failed and it is now accepted that the most effective method for protecting proprietary software is through the vehicle of use protection and not copy protection. Use protection generally involves the encryption of the software and its decryption at the point of use. A classic method used to send digital information securely between a provider and a consumer is via a single key crypto system such as is prescribed in the "Data Encryption Standard" by the National Bureau of Standards. In this process, a single key is used for encryption and decryption, is kept secret and, for added security, is changed frequently. One process for key changing is termed "key chaining" and involves the placing of new keys at agreed upon places within an encrypted data stream. Absolute security of this method relies on the secrecy of, at least, one seed key. Since the data communications channel usually is not physically secure, the seed key is often delivered to the consumer via a physically secure channel, such as a trusted courier. This is not a practical method for high volume environments with many consumers and many types of data streams.

A dual key crypto system using both a public and private key can eliminate the key distribution problem, but requires that the data stream be encrypted with a consumer's unique public key. In such instance, the term "public key" means that its identity is disclosed to the media provider. The term "private key" means that its identity is concealed from the media provider, but may be discovered if the consumer does not exert sufficient efforts to maintain its security. The public and private keys may be a pair of keys as in a true dual key crypto system. Alternatively, assuming a level of trust exists between the provider and consumer, the private key may be the secret key of a single key crypto system and the public key used to identify which secret key is used, without disclosing the actual key. Thus, in order to restrict access to some subset of all consumers and still employ a dual key crypto system, the media provider must send a differently encoded data stream to each consumer, which data stream is then decrypted by the consumer's private key. This procedure is also not practical for high volume environments.

A combination of dual key and single key crypto systems can reduce the above-noted problems. There, media is encrypted by a single master key within a provider's physically secure environment. The master key (hereinafter referred to as Media Master Key or MMK) is then further encrypted using a public key provided by the consumer or a secret key possessed both by the provider and the consumer. The encrypted MMK and is then distributed along with the media or via a separate key request transaction. The consumer then uses its private key to decrypt the MMK. The de-encrypted MMK then enables decrypted of the media in the consumer's secure physical environment.

The above described data security techniques and variations thereof can be found in the following prior art. In U.S. Pat. No. 4,465,901 to Best, a crypto-microprocessor executes an enciphered program by piecemeal deciphering of enciphered instructions, as it needs them. By deciphering small portions of the program only when they are needed, Best avoids the need for storing the entire program in its deciphered form. Various methods of encryption are described, with Best indicating that the microprocessor chip may use a unique cipher key or table for deciphering program instructions so that the program can be executed on one chip and cannot be run on any other microprocessor.

In U.S. Pat. No. 4,558,176 to Arnold et al., media protection is implemented by uniquely enciphering the media for each customer. Furthermore, the Arnold et al. central processing unit is required to switch modes when changing from encrypted software to non-encrypted software. Thus, express instructions must be provided to enable the mode switch and the application programmer must be aware of the mode switch requirements.

U.S. Pat. No. 4,634,807 to Chorley et al. describes an add-on to a host computer which employs a data encryption algorithm and a key that is encrypted using a public key of a public/private key system. The encrypted software module is entered into a software protection device where the private key decodes the data encryption key. Once the decryption is complete, the host computer is enabled to use the decoded software but it does so through an input/output channel which is accessible to the user and is a point at which a decryption attack can be levelled.

U.S. Pat. No. 4,807,288 to Ugon et al. describes a one chip microprocessor for implementing a public/private key encryption function. The chip microprocessor does not execute the data but merely acts as a decoder. The system is thus subject to attack at the input/output port to the microprocessor.

U.S. Pat. No. 4,850,017 to Matyas, Jr. et al. describes a dual key encryption system wherein control values are authenticated and control access to cryptographic keys.

U.S. Pat. No. 4,847,902 to Hampson, describes a computer which selectively decrypts instructions from main memory, using one of a plurality of keys. Instructions are decrypted only during execution when these instructions are transferred from main memory to a cache memory associated with the computer. In the Hampson system, only one key is activated at any one time, and a switch of keys requires a call to a subroutine. Thus, while key switching is enabled, it is accomplished in a manner which must be known to the application programmer and accounted for in the program. Further, there is no indication in Hampson that he addresses both encrypted data and instructions.

U.S. Pat. No. 4,888,798 to Earnest describes computer software that includes both authorized and unauthorized elements. The user may unlock any one or more of the authorized elements by entering corresponding encryption keys, usually a key for each authorized element. In addition, multiple keys are indicated as being utilized to enable access to a de-encrypting key.

In summary, the prior art indicates use of encrypted data, encrypted instructions, the use of encrypted keys to decrypt software, the use of clear keys for decryption purposes and the use of secure processing environments wherein decrypted data is protected. In much of the above prior art, however, user access is allowed to either clear data or clear instructions as they are passed back and forth between a processor and a decrypting processor. Furthermore, in the known prior art, the operating processor is required to operate in different modes when dealing with encrypted and non-encrypted software media. As a result, the application software designer must continually be aware of such modes and invoke them at the proper times.

Accordingly, it is an object of this invention to provide a system for handling encrypted media wherein the system's central processing unit is able to handle both encrypted and non-encrypted data and instructions in a seamless fashion.

It is another object of this invention to provide a system for encrypted and de-encrypted of software media that is integrated into a memory management architecture of a central processing unit.

It is still a further object of this invention to enable a central processing unit to simultaneously access encrypted and non-encrypted instructions and data without the need for explicit mode switch instructions.

SUMMARY OF THE INVENTION

The data processing system herein seamlessly processes both encrypted and non-encrypted data an instructions. The system includes an internal cache memory in a secure physical region that is not accessible to a user of the system. An external memory is positioned outside of the secure physical region and stores encrypted and non-encrypted data and instructions. The system includes an instruction to access a private key contained within the secure physical region. That key is used to decrypt an encrypted master key that accompanies encrypted data and instructions. An interface circuit is positioned in the secure physical region and decrypts each encrypted master key through the use of the private key and also decrypts encrypted data and instructions associated with each decrypted master key. A plurality of segment registers in the secure physical region maintain a record of active memory segments in the external memory and associates therewith each decrypted master key. A central processor accesses segments of both non-encrypted and encrypted data and instructions from the external memory and causes the interface circuit to employ a decrypted master key to de-encrypt data and instructions from the external memory and to store the de-encrypted information in the internal memory cache. Non-encrypted data and instructions are directly stored in the internal memory cache.

DETAILED DESCRIPTION OF THE INVENTION

Figure 1:
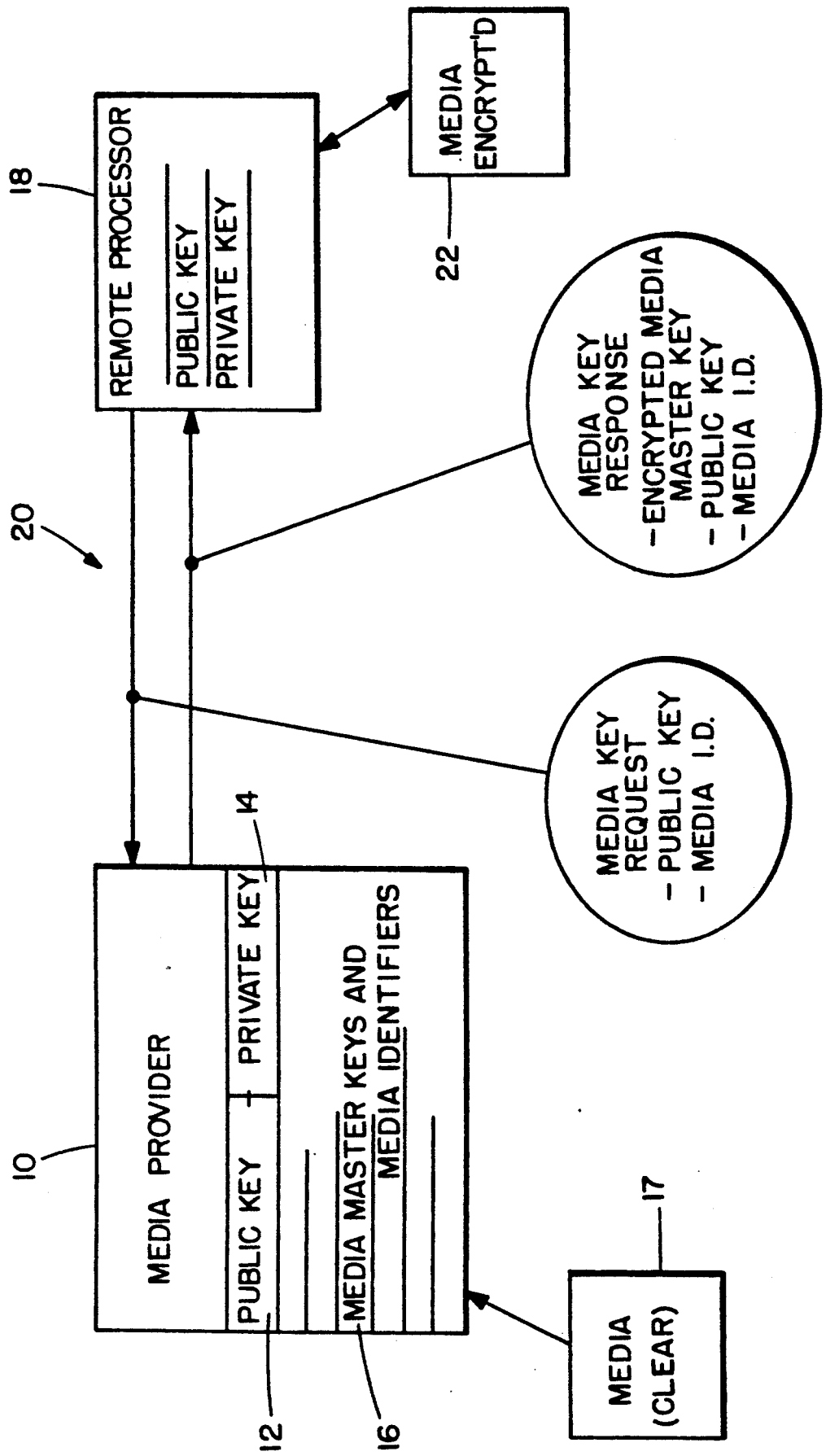
FIG. 1 illustrates interactions between a media provider and a remote processor whereby encrypted media is transferred to the remote processor along with an encrypted media master key.

In FIG. 1, media provider 10 is a facility responsible for the secure storage of associated pairs of public keys 12 and private keys 14. A public key 12 may be a remote processor's serial number or other number assigned to it by either a manufacturer or media provider 10. A private key 14 may be a number or other alphanumeric sequence assigned to the remote processor by media provider 10 or the vendor of the remote processor or from another source. Public and private keys 12 and 14 may be a pair of keys as in a true dual key crypto system. Alternatively, private key 14 may be the secret key of a single key crypto system and public key 12 used as a means to identify which secret key is used, without disclosing the actual key. Media provider 10 contains a complete record of all public keys 12 and their associated private keys 14. Media provider 10 also contains MMK's 16 which are used to encrypt media 17 and associated media identifiers that identify the encrypted media A remote processor 18 is connected to media provider 10 via a duplex communication channel 20. Remote processor 18 has an input for encrypted media 22 and contains copies in storage of both its public and private keys, such storage being physically inaccessible to the user. The public key is accessible to the user via a program instruction. Remote processor 18 may obtain encrypted media directly from media provider 10 over channel 20, or from a local source. In either case, the media is commonly encrypted using a media master key. Different media may be encrypted with different media master keys.

Once a user obtains encrypted media 22, either directly or via channel 20, the user causes remote processor 18 to transmit a media key request to media provider 10. The media key request includes a copy of the user's public key and the media identifier of the requested media. When that information is received by media provider 10, the received public key 12 enables a locally stored (and associated) private key 14 to be accessed. At the same time, the media identifier is used to access a particular media master key that was used to encrypt the requested media. Then, the accessed private key 14 is used to encrypt the media master key and the encrypted media master key is then transmitted back to remote processor 18 as part of a media key response from media provider 10.

Upon receipt of the encrypted media master key, it is entered into a secure physical region of remote processor 18 and is de-encrypted using a copy of private key 14 that is stored therein. A clear copy of the media master key is then stored within the secure physical region and is employed to decrypt the media as it is processed within a secure physical region within remote processor 18.

In the described manner, security is maintained by never disclosing decrypted copies of either private key 14 or the media master key in any facility accessible to the public. Further, encrypted media is decrypted utilized, and then, if necessary, re-encrypted, all within a secure physical region within remote processor 18. In this way, use of encrypted media 22 is controlled, and there is no requirement for personalized encryption of the media, as it is only the media master key that is specially encrypted. Thus, encrypted media 22 can be generally distributed so long as the encrypted status of the media master key is securely maintained. The encrypted media is unusable to those that have not been provided with an appropriately encoded media master key.

Figure 2:
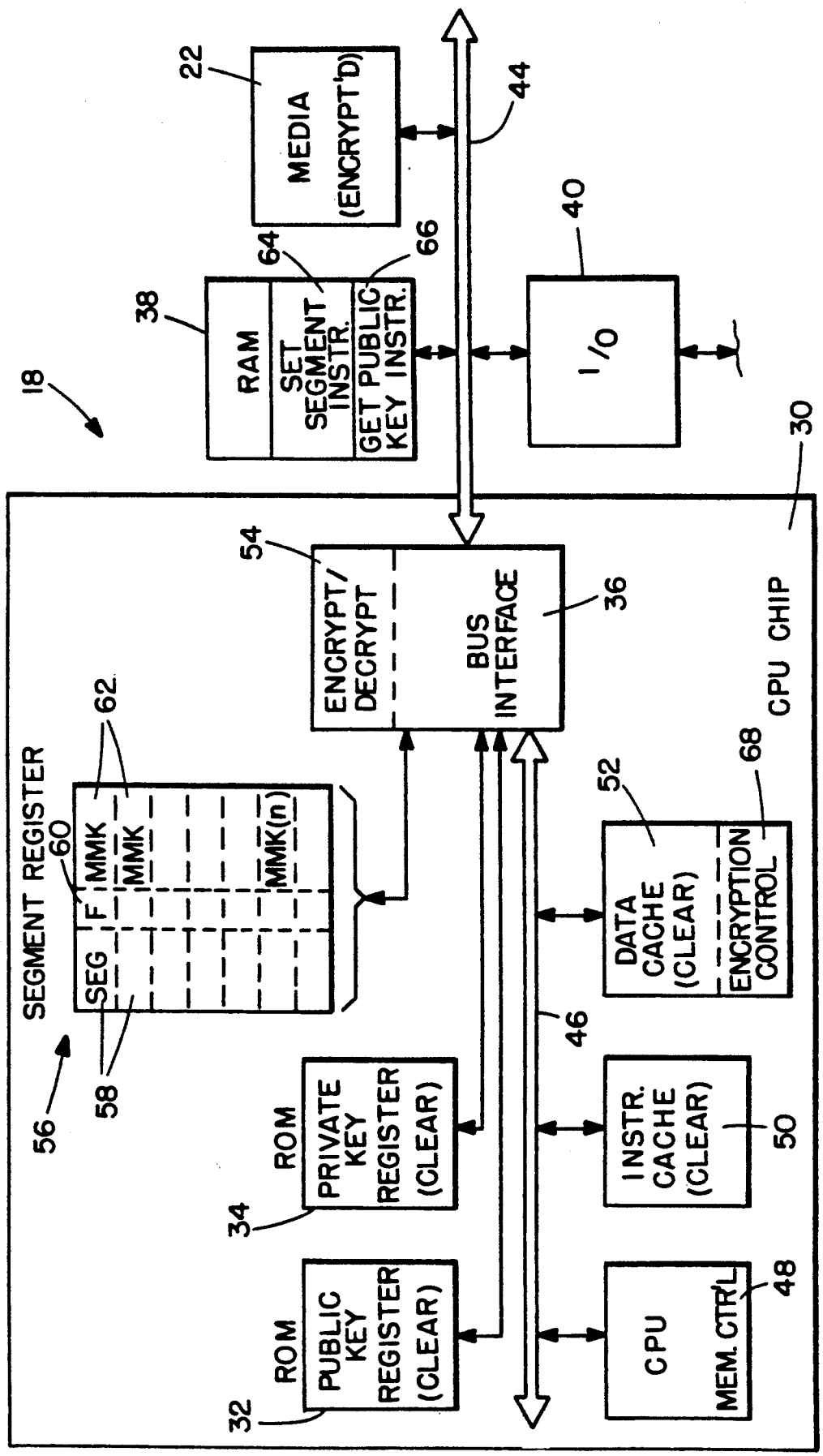
FIG. 2 is a block diagram of a portion of the remote processor of FIG. 1, illustrating portions thereof that are involved in the encryption/de-encryption of both the media master key and received information.

Turning now to FIG. 2, the secure physical region within processor 18 comprises CPU semiconductor chip 30 and its included circuitry, all of which is inaccessible to the user. As will be hereinafter understood, only within CPU chip 30 is there found decrypted media in its clear form, a clear copy of a private key 14 and decrypted copies of various media master keys.

CPU chip 30 contains two programmable read-only memory (ROM) registers, one register 32 containing a decrypted form of a public key 12 and one register 34 for containing a decrypted form of the processor's private key 14. Both registers are programmed by the manufacturer or by the first seller and once programmed may not be altered. As above indicated, the value in public key register 32 may be a serial number of processor 18 that is assigned by the manufacturer. The number in private key register 34 is an identifier assigned by the manufacturer and is uniquely paired with public key register 32 within processor 18.

Registers 32 and 34 provide their outputs to a bus interface module 36 that provides all interface functions between CPU chip 30 and the external components of processor 18. Those external components include a random access memory (RAM) 38, one or more I/O ports 40 and one or more media systems 22. Media system 22 may be a floppy disk system, a cartridge read/only or read/write system, etc. Each of the aforementioned components of processor 18 is connected to bus interface module 36 via a bus 44.

Within CPU chip 30 a bus 46 provides internal communications between CPU 48, an instruction cache 50 and a data cache 52. Contained within bus interface 36 is an encryption/decryption module 54 that functions to decrypt incoming encrypted instructions and data on bus 44 for use within CPU chip 30 and to encrypt outgoing data on bus 44 for storage in RAM 38, passage to I/O port 40 or into media 22. No "secure" data ever appears in a decrypted state on bus 44 or in any of modules 38, 40 or 22.

A plurality of memory segment registers 56 are connected to bus interface 36 and, in addition to providing known segment identification functions, perform a special function of indicating whether information in a memory segment includes encrypted information and, if so the decrypted media master key that will decrypt the encrypted information. As is known to those skilled in the art, segment registers hold values that control which portions of memory a program uses and are classified as code segments, data segments or stack segments.

CPU chip 30 has a segmented memory and to a program, the memory's address space is divided into chunks or segments and the program can only access data contained in those segments. Within each segment, addressing is linear and the program can access byte 0, byte 1, byte 2, etc. with the addressing being relative to the start of the segment. Active data/instruction segments are tracked by the program's use of various ones of segment registers 56.

Each segment register 56 contains a first field 58 that includes the segment's start address and a length designator or ending address of the data/instructions encompassed by the segment.

Associated with field 58 is an additional section 60 that includes an indication of whether the memory segment is encrypted or non-encrypted Field 60 may be comprised of a single bit (or flag) to provide such an indication. Each segment register also has a third field 62 for storage of a decrypted media master key that will enable decryption of information stored in the associated memory segment.

As a variety of program segments from different sources may be invoked during the operation of CPU chip 30, a plurality of segment registers 56 are provided, each separately programmed to indicate its encryption state and the media master key that is to be used in decryption or encryption of information in the memory segment.

As above indicated, an objective of this invention is to accomplish encryption and decryption in a manner which is integrated into the memory management architecture of processor 18. By organizing the procedures within processor 18 in such a manner, protected (encrypted) instructions and data can be accessed along with non-protected instructions and data, with there being no need for an explicit mode switch within the processor. In other words, procedures in processor 18 operate in a mode that is transparent to whether the data/instructions are encrypted or non-encrypted. This manner of operation is accomplished by the inclusion of two special instructions used by the operating system of processor 18. Those instructions are illustrated, schematically, in RAM 38 as Set Segment Key instruction 64 and Get Public Key instruction 66.

Set segment key instruction 64 uses private key value 14 in private key register 34 (within CPU chip 30) to decrypt a received encrypted media master key. The resulting clear media master key is stored in segment register 56 at a position 62 adjacent the particular program segment encrypted with the specific media master key. The set segment key instruction 64 is also used to turn on or to turn off the associated encryption bit 60. It is to be understood, that while set segment key instruction 64 resides in RAM 38, all functions performed in accordance with its commands occur within CPU chip 30 and are hidden from the user.

Get public key instruction 66 returns a public key value 12 from public key register 32. As aforementioned, the public key value in public key register 32 is a number that is unique to CPU chip 30 and, in media provider 10 (FIG. 1), is associated with the private key value 14 in private key register 34. Within media provider 10, the public key value 12 received from processor 18 is used to access the stored and associated private key value 14 of processor 18. That private key value is then used to encrypt the media master key which was used to encrypt media 22.

When media provider 10 returns the encrypted media master key to processor 18 via media 42 or I/O port 40, it is temporarily stored in RAM 38. Then, set segment key instruction 64 is executed and causes the encrypted media master key to be read to bus interface 36. Bus Interface 36, under control of encryption/decryption module 54 uses the private key value 14 (stored in private key register 34) and employs the private key 14 to decrypt the media master key. The decrypted media master key is then placed in segment register 56 in field 62 adjacent the address of the media that was encrypted with the media master key. At the same time, a bit in associated register position 60 is set to indicate the fact that the segment is encrypted.

Now, assuming that CPU 48 calls for data or instructions not present in either instruction cache 50 or data cache 52, such instruction causes the appropriate information to be read from RAM 38 to bus interface 36, irrespective of whether the information is encrypted or non-encrypted. If the information is encrypted, bus interface 36 knows that fact by virtue of the state of the flag in memory segment field 60. Assuming that the data segment is encrypted, bus interface 36 calls for the de-encrypted media master key in field 62 of segment register 56 associated with the recalled address. That media master key is then employed by encryption/decryption module 54 to decrypt the incoming information, with the decrypted information then being placed in either data cache 52 or instruction cache 50, as the case may be.

By contrast, if bus interface 36 receives non-encrypted data from RAM 38, the lack of a set flag in field 60 in the associated segment register 56 indicates that the arriving information is non-encrypted. In such case, bus interface 36 passes the requested data to the respective cache memory without alteration.

As can thus be seen, CPU chip 30 operates on data in a seamless fashion, irrespective of whether the data is encrypted or non-encrypted or which of many memory segments contain the data. There is no requirement for mode switching to handle encrypted data, nor are decrypted data/instructions ever available to the user. If the system requires more than one CPU chip, a bus interface must be provided for each CPU chip so that only encrypted data travels between chips.

To enable further data security, an encryption control module 68 is contained within data cache 52 and prevents an encrypted data segment from being referenced by other than an encrypted instruction segment. Thus, when an executing instruction references data from data cache 52, encryption control 68 checks to determine whether the instruction resides in a memory segment containing a set flag in field 60 of a segment register 56. If the flag in field 60 is set, the instruction is enabled to call any data or instruction, irrespective of whether that data/instruction is from an encrypted or non-encrypted memory segment. If the instruction is indicated as being from a non-encrypted code segment, encryption control 68 inhibits it from referencing any encrypted data segment. This feature prevents reverse engineering of code by disassembly. It also prevents an intruder from creating a program to copy an encrypted data segment into an unencrypted data segment. This is because all encrypted program instructions must come from the media provider as the media provider is the only one who can create an encrypted MMK for the program.

Lastly, if segment register 56 is employed in a virtual memory processor system, the Set Segment Key instruction is indirectly performed by extending the existing virtual segment descriptors by adding fields for an encrypted media master key and a flag. Those fields indicate the encryption/non-encryption state of the associated virtual memory segment.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A data processing ssytem for processing both encrypted and non-encrypted data and instructions, said system including a secure physical region in accessible to a user of said system, said system comprising:
   internal memory means positioned internally within said secure physical region, for storing decrypted and non-encrypted digital information;
   external memory means positioned external to said secure physical region, for storing an instruction to access a private key within said secure physical region for use in decrypting an encrypted master key;
   interface means in said secure physical region for decrypting said encrypted master key through the use of an accessed private key and for decrypting information encrypted with a said master key;
   segment register means in said secure physical region for maintaining a record of active memory segments and for associating decrypted master keys therewith; and
   a central processor within said secure physical region for accessing segments of both non-encrypted and encrypted information stored in addresses in said external memroy means and for causing said interface means to employ a said decrypted master key, that is associated in said segment register means with an address that has been accessed, to decrypt information from said address and to store decrypted information in said itnernal memory means and, in the case of non-encrypted information from said external memory means, to directly store said information in said internal memory means.

2. The data processing system as recited in claim 1 wherein said information may be either data or instructions or both.

3. The data processing system as recited in claim 2 wherein said segment register means includes a flag which indicates whether information within a said data segment are encrypted or not, said interface means being responsive to a said flag in its processing of information from said external means.

4. The data processing system as recited in claim 3 wherein said interface means is responsive to a said flag to enable encryption of information that is being transferred from said internal memory means to said external memory means, if said flag indicates said segment includes encrypted information.

5. The data processing system as recited in claim 2 further comprising:
   encryption control means for preventing a non-encrypted instruction from accessing any memory segment that contains encrypted information.

6. The data processing system as recited in claim 5 wherein said segment register means includes a flag associated with each active memory segment, said flag indicating an encrypted status, said encryption control means responsive to a state of said flag in performing its function.

7. The data processing system as recited in claim 1 wherein said segment register means comprises a plurality of registers, each said register including a segment address and length or end address field, a flag field, and a field for holding a decrypted media master key, each said register employed by said CPU in its accessing of data addresses within a said segment.

8. The data processing system as recited in claim 7 further comprising:

read only memories within said secure physical region for storing both a public key and a private key.

9. The data processing system as recited in claim 8, wherein said external memory means includes an instruction to return said public key from said public key read only memory for storage in said external memory means, whereby said public key may be transmitted to a secure locale where it is stored in association with said private key, said private key thereby being accessible for use in encrypting a media master key.

10. The data processing system as recited in claim 1 wherein all instructions and data transferred between said central processor and said interface means occur within said secure physical region and are thereby inaccessible to a user.

11. The data processing system as recited in claim 1 wherein said segment register means tores a plurality of decrypted media master keys for decrypting data and instructions contained in media encrypted through the use of said media master keys, said decrypted data and instructions employed by said central processor.

12. In a data processing system that processes both encrypted and non-encrypted data and instructions, said system including a secure physical region inaccessible to a user of said system, a method for assuring seamless processing of both encrypted and non-encrypted digital information comprising:
  storing in said secure physical region decrypted and non-encrypted digital information;
  storing in external memory means external to said secure physical region, an instruction to access a private key within said secure physical region for use in decrypting an encrypted master key;
  decrypting in an interface means in said secure physical region, said encrypted master key through the use of an accessed private key and decrypting information encrypted with a said master key;
  maintaining in a segment register means in said secure physical region, a record of active memory segments and associated decrypted master keys;
  accessing within said secure physical region segments of both non-encrypted and encrypted information stored in addresses in said external memory means;
  causing said interface means to employ a said decrypted master key that is associated in said segment register means with an address that has been accessed, to decrypt information from a said address; and
  storing said decyrpted information in said internal memory means and, in the case of non-encrypted information from said external memory means, storing said information in said internal memory means.

13. The method as recited in claim 12 wherein said segment register means includes a flag which indicates whether information within a said data segment are encrypted or not, said interface means being responsive to a said flag in its processing of information from said external means.

14. The method as recited in claim 13 wherein said interface means is responsive to a said flag to encrypt information that is being transferred from said internal memory means to said external memory means, if said flag indicates said segment includes encrypted information.

15. The method as recited in claim 12 further comprising the step of:
  preventing a non-encrypted instruction from accessing any memory segment that contains encrypted information.

* * * * *